United States Patent Office 3,637,719
Patented Jan. 25, 1972

3,637,719
5-[2-(PHENYLAMINO)-3-PYRIDYL]TETRAZOLES SUBSTITUTED IN THE PHENYL NUCLEUS
Charles Hoffmann, Enghien-les Bains, and Andree Dordilly, born Faure, Paris, France, assignors to Societe Anonyme dite: Hexachimie, Gennevilliers, France
No Drawing. Filed July 10, 1969, Ser. No. 840,840
Claims priority, application Great Britain, July 10, 1968, 32,986/68
Int. Cl. C07d 31/42
U.S. Cl. 260—296 R
2 Claims

ABSTRACT OF THE DISCLOSURE

Novel 5-[2-(phenylamino)-3-pyridyl]tetrazoles substituted in the phenyl nucleus, e.g. by trifluoromethyl, are useful as anti-inflammation agents, analgesics, and local anaesthetics.

The present invention provides the 5-[2-(phenylamino)-3-pyridyl]-tetrazoles of the formula:

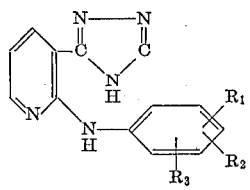

I in which $R_1$, $R_2$ and $R_3$ each represent hydrogen or halogen atoms or lower alkyl, lower alkoxy, lower halogenalkyl, hydroxyl, carboxyl, or lower alkoxycarbonyl radicals, with the proviso that not all of $R_1$, $R_2$ and $R_3$ represent hydrogen. These compounds are indicated for future study in human therapy, especially as anti-inflammation agents, analgesics and local anaesthetics, on the basis of screening tests.

The pyridyl-tetrazoles of Formula I can most advantageously be prepared by subjecting nitriles of the formula:

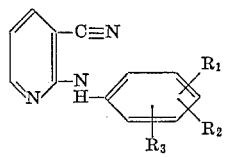

II to the action of hydrazoic acid ($HN_3$), prepared in situ from sodium azide ($NaN_3$). Thus, the 2-phenylaminonicotinonitrile of Formula II may be brought into contact with sodium azide and ammonium chloride in an anhydrous solvent such as dimethylformamide, and the mixture is heated to about 125–130° C. for a period of about 15 to 20 hours with stirring, and the desired product is then isolated.

The compounds obtained behave like acids and yield alkali metal salts which are soluble in water.

The invention is illustrated by the following examples.

EXAMPLE 1

5-[2-(m-trifluoromethylphenyl)amino-3-pyridyl]tetrazole 10 g. of 2-(m-trifluoromethylphenyl)amino-nicotinonitrile, 3 g. of sodium azide and 2.46 g. of ammonium chloride are suspended in 80 cm.³ of anhydrous dimethylformamide and heated for 20 hours at 125°±5° C., with mechanical agitation. The dimethylformamide is then evaporated under reduced pressure (20 mm. Hg) and the residue poured into 1 litre of water. The pH is adjusted to 8 with sodium hydroxide solution and the mixture treated with decolourizing charcoal and filtered. The filtrate is acidified to pH 2 with hydrochloric acid, and a white precipitate of the tetrazole derivative is obtained. The mixture is kept in ice for 2 hours, and filtered. The product is washed with water until neutral, recrystallised from a mixture of water and ethanol (50:50), and dried to constant weight at 100°–110° C. 11.6 g. (96% yield) of the desired product are obtained. It melts at 178° C. on a Kofler bench if it is thoroughly dry. It forms a monohydrate melting at about 132°–134° C.

Analysis.—Calculated for $C_{13}H_9F_3N_6$ (percent): C, 50.98; H, 2.96; N, 27.44; F, 18.61. Found (percent): C, 50.91; H, 3.05; N, 28.04; F, 18.70.

EXAMPLE 2

5-[2-(2,3-xylyl)amino-3-pyridyl]tetrazole 14.9 g. of 2-(2,3-xylyl)amino-nicotinonitrile, 5.21 g. of sodium azide, and 4.29 g. of ammonium chloride are suspended in 100 cm.³ of dimethylformamide and heated to 125°±5° C. for 20 hours with stirring. After evaporating the dimethylformamide under reduced pressure, the residue is treated with 1 litre of water and the pH adjusted to 9. The solution is treated with charcoal and filtered. The filtrate is acidified to pH 2 with hydrochloric acid. A fine white precipitate of the desired product forms and this is allowed to stand in the cold, and then filtered and washed with water until neutral. After drying at 100–110° C., 14.05 g. (80% yield) of the desired product are obtained, M.P. 257° C. (inst. Kofler bench). The material can be recrystallised from methanol without change of its melting point.

Analysis.—Calculated for $C_{14}H_{15}N_6$ (percent): C, 63.13; H, 5.30; N, 31.56. Found (percent): C, 63.15, H, 5.20; N, 31.87.

EXAMPLE 3

5-[2-(2,6-xylyl)amino-3-pyridyl]tetrazole 8.7 g. of 2-(2,6-xylyl)amino-nicotinonitrile (M.P. 114–116° C.), 3.3 g. of sodium azide and 2.71 g. of ammonium chloride are suspended in 85 ml. of anhydrous dimethylformamide and kept at between 125–130° C. for 16 hours. After evaporating the dimethylformamide under reduced pressure, the residue is taken up in water and acidified to pH 3 with hydrochloric acid. 9.72 g. of the tetrazole are obtained and are recrystallised from dioxane; M.P. 264° C. on the Kofler bench.

| Analysis for $C_{14}H_{14}N_6$ | Calculated | Found |
|---|---|---|
| Percent: | | |
| C | 63.13 | 68.82 |
| H | 5.30 | 5.21 |
| N | 31.56 | 31.00 |

EXAMPLE 4

5-[2-(2-methyl-3-chlorophenyl)amino-3-pyridyl]tetrazole 3.89 g. of 2-(2-methyl-3-chloro)anilino-nicotinonitrile (M.P. 134° C.), 1.27 g. of sodium azide and 1.045 g. of ammonium chloride are suspended in 32.5 ml. of dimethylformamide and heated on an oil bath to 127°±5° C. for 15 hours. The dimethylformamide is then evaporated in vacuo and the residue is taken up in 50 ml. of water. A yellow limpid solution of pH about 6 is obtained. On acidifying to pH 2–3 with concentrated hydrochloric acid, a half-solid, half-pasty product is precipitated. This is redissolved in water in the presence of a minimum of 2 N sodium hydroxide solution. After filtering, the solution is again acidified with dilute hydrochloric acid (1:10). A creamy-white solid precipitate is thus obtained, which is separated, washed with water and dried at 100° C. 4.4 g. of product are obtained, which are recrystallised from 50 ml. of isopropanol. The product melts at 213°–214° C. (on the Kofler bench).

| Analysis for $C_{13}H_{11}N_6Cl$ | Calculated | Found |
|---|---|---|
| Percent: | | |
| C | 54.45 | 54.31 |
| H | 3.86 | 3.83 |
| N | 29.31 | 29.20 |
| Cl | 12.36 | 12.53 |

EXAMPLE 5

5-[2-(3-trifluoromethyl-4-chlorophenyl)amino-3-pyridyl]tetrazole 20 g. of 2-(3-trifluoromethyl-4-chlorophenyl)amino-nicotinonitrile (M.P. 170–172° C.) are treated with 5.25 g. of sodium azide and 4.31 g. of ammonium chloride in 150 ml. of anhydrous dimethylformamide, as in the preceding examples, to yield 22 g. of the corresponding tetrazole which, when recrystallised from toluene, melts at 182–184° C. on the Kofler bench.

| Analysis for $C_{13}H_8ClF_3N_6$ | Calculated | Found |
|---|---|---|
| Percent: | | |
| C | 10.40 | 10.45 |
| N | 24.66 | 24.3 |

EXAMPLE 6

5-[2-(p-anisidino)-3-pyridyl]tetrazole 11 g. of 2-p-anisidino-nicotinonitrile (M.P. 158–160° C. inst.) 3.81 g. of sodium azide, 3.13 g. of ammonium chloride and 100 ml. of anhydrous dimethylformamide are heated to 125°–130° C. for 16 hours. The solvent is distilled off and the residue is taken up in water and acidified. 11.6 g. of product are obtained, M.P. 212°–214° C. When recrystallised from isopropanol or methyl ethyl ketone, the product has a melting point of 214° C.

| Analysis for $C_{13}H_{12}N_6O$ | Calculated | Found |
|---|---|---|
| Percent: | | |
| C | 58.20 | 58.0 |
| H | 4.51 | 4.56 |
| N | 31.33 | 31.0 |

EXAMPLE 7

5-(2-p-phenetidino-3-pyridyl)tetrazole 22 g. of 2-p-phenetidino-nicotinonitrile (M.P. 140° C. inst.), 7.2 g. of sodium azide, 5.9 g. of ammonium chloride and 180 ml. of anhydrous dimethylformamide are heated to 125°–130° C. for 16 hours. The solvent is distilled and the residue is poured into water and dissolved at an alkaline pH. The solution is decolourised, filtered, and acidified to pH 3 with hydrochloric acid. The product is filtered off, washed with water, and dried first at 60° C. and then at 100° C. 25 grams of product (M.P. 174–176° C. inst.) are obtained and are recrystallised from 15 volumes of isopropanol.

| Analysis for $C_{14}H_{14}N_6O$ | Calculated | Found |
|---|---|---|
| Percent: | | |
| C | 59.56 | 59.42 |
| H | 5.00 | 4.99 |
| N | 29.77 | 29.70 |

The pharmacological activities of the compounds of Formula I have been demonstrated by the following tests.

(1) ACUTE TOXICITY

This is calculated from the mortality rate seven days after oral administration of varying doses of the product under test to mice or to male rats of the Chelles strain each weighing 110 to 130 grams.

(2) ANTI-INFLAMMATION ACTIVITY

Carrageenin oedema

Male rats of the Chelles strain, each weighing 110 to 130 g., receive the compound under test in two oral administrations, two hours and 30 minutes respectively before administration of the carrageenin, in a total volume of ml./100 g. The swelling of the paw which has received 0.05 ml. of a 1% strength solution of carrageenin subcutaneously in the sole of the paw is measured by plethysmography 1½ hours, 3 hours and 4½ hours after administration of the carrageenin.

(3) ANALGESIC ACTIVITY (a) Phenylbenzoquinone method

Male mice of the Ardenay strain, each weighing 19 to 20 grams, receive the compound under test in two oral administrations 2 hours and 30 minutes respectively before administration of the phenylbenzoquinone. The pain reactions caused by intraperitoneal injection of 5 mg./kg. of phenylbenzoquinone are recorded from the 5th to the 10th minute after the injection.

(4) ULCERIGENIC ACTION

Six hours after oral administration of the compound under test to male rats of the Chelles strain, each weighing 140 to 160 grams, which had fasted for eighteen hours, the stomachs are removed and the number of ulcers is counted. Ten rats were used at each dosage level. The assessment is recorded as follows:

0—no ulcer
1—1 to 2 ulcers
2—3 to 4 ulcers
3—more than 4 ulcers

The average, for each dose, of this figure, multiplied by the percentage of animals showing ulceration gives the ulceration index of which the maximum is 300.

The results obtained with the product of Example 1 are given below with, for purposes of comparison, those for flufenamic acid of formula:

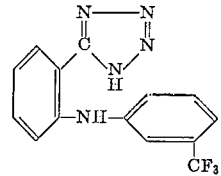

(called "comparison").

The compound of Example 1 is hereafter designated UP 258.

(1) Acute toxicity:

Table I gives the $LD_{50}$ values when administered orally, mg./kg.

TABLE I

| | Rat | Mouse |
|---|---|---|
| Comparison | 750 | 300 |
| UP 258 | 1,083 | 400 |

(2) Carrageenin oedema:

TABLE II

| | Percent inhibition | | |
|---|---|---|---|
| Comparison, mg./kg., administered orally | 1 hr. 30 mins. | 3 hrs. | 4 hrs. 30 mins. |
| 0 | | | |
| 12.5 | 21 | 32 | 26 |
| 25 | 17 | 38 | 24 |
| 50 | 25 | 55 | 51 |
| 100 | 30 | 64 | 56 |
| 200 | 40 | 73 | 67 |

TABLE II bis

| UP 258, mg./kg., administered orally | Percent inhibition | | |
|---|---|---|---|
| | 1 hr. 30 mins. | 3 hrs. | 4 hrs. 30 mins. |
| 6.25 | 26 | 15 | 12 |
| 12.5 | 30 | 28 | 16 |
| 25 | 40 | 18 | 12 |
| 50 | 59 | 63 | 47 |
| 100 | 70 | 73 | 53 |
| 200 | 68 | 70 | 60 |
| 400 | 84 | 82 | 72 |

The $ED_{50}$ (mg./kg. administered orally) 3 hours after administration of carrageenin is 35 for UP 258 against 128 for the comparison compound..

(3) Phenylbenzoquinone method:

TABLE III

| Comparison (mg./kg. administered orally): | Percent inhibition |
|---|---|
| 0 | -- |
| 25 | 3 |
| 50 | 26 |
| 100 | 43 |
| 200 | 57 |

TABLE III bis

| Up 258 (mg./kg. administered orally): | Percent inhibition of pain reactions |
|---|---|
| 12.5 | 27 |
| 25 | 43 |
| 50 | 54 |
| 100 | 77 |
| 200 | 90 |

The $ED_{50}$ for the comparison is 140 mg./kg. administered orally, while that for UP 258 is 38 mg./kg. administered orally.

(4) Ulcerigenic activity:

TABLE IV

| Comparison, mg./kg. administered orally | Number of rats showing a number of ulcers | | | | Ulceration index |
|---|---|---|---|---|---|
| | 0 | 1 to 2 | 3 to 4 | >4 | |
| 0 | 10 | 0 | 0 | 0 | 0 |
| 50 | 9 | 1 | 0 | 0 | 1 |
| 100 | 8 | 2 | 0 | 0 | 4 |
| 200 | 5 | 2 | 2 | 1 | 45 |

With 400 mg./kg., three deaths are detected two hours after the treatment, with greatly accentuated rigidity in the five minutes following the stoppage of breathing.

TABLE IV bis

| UP 258, mg./kg. administered orally | Number of rats showing ulcers | | | | Ulceration undex |
|---|---|---|---|---|---|
| | 0 | 1 to 2 | 3 to 4 | >4 | |
| 0 | 10 | 0 | 0 | 0 | 0 |
| 100 | 9 | 1 | 0 | 0 | 1 |
| 200 | 9 | 1 | 0 | 0 | 1 |
| 400 | 6 | 0 | 2 | 2 | 40 |

UP 258 can advantageously be administered to humans in the form of capsules containing 200 mg. each at the rate of 3 to 4 capsules daily in two doses.

ACTIVITIES OF THE OTHER COMPOUNDS OF THE INVENTION (1) Acute toxicity:
Table V shows the $LD_{50}$, in mg./kg., calculated 7 days after the treatment. The products are administered orally.

TABLE V

| Product of Example: | Rat | Mouse |
|---|---|---|
| 2 | 750 | 300 |
| 4 | 750 | 900 |
| 5 | 500 | 300 |
| 6 | >2,000 | 1,000 |
| 7 | 2,000 | 1,000 |
| 3 | 1,500 | 750 |

(2) Carrageenin oedema:

TABLE VI

| Product of example | $ED_{50}$ mg./kg. administered orally |
|---|---|
| 2 | 225 |
| 4 | 105 |
| 5 | 80 |
| 6 | ⎫ |
| 7 | ⎬ $ED_{50}$ greater than 200 mg./kg. administered orally. |
| 3 | ⎭ |

(3) Phenylbenzoquinone method:

TABLE VII

| Product of example | $ED_{50}$ mg./kg. administered orally |
|---|---|
| 2 | 90 |
| 4 | 115 |
| 5 | 100 |
| 6 | 220 |

(4) Ulcerigenic activity:
The compounds of Examples 2, 3, 4, 6 and 7 are inactive up to 400 mg./kg. administered orally.

The invention thus includes within its scope pharmaceutical compositions comprising a compound of Formula I in association with a significant amount of a compatible pharmaceutical carrier.

We claim:
1. A 5-[2-(phenylamino) - 3 - pyridyl]tetrazole of the formula:

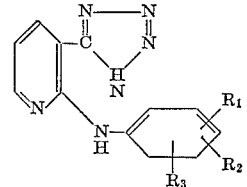

in which $R_1$, $R_2$ and $R_3$ each represent hydrogen or halogen atoms or lower alkyl, lower alkoxy, or lower halogenoalkyl radicals, with the proviso that $R_1$, $R_2$ and $R_3$ do not all represent hydrogen.

2. A compound according to claim 1 which is 5-[2-(m-trifluoromethylphenyl)amino-3-pyridyl]tetrazole.

References Cited

UNITED STATES PATENTS 3,378,564  4/1968  Holland _____ 260—294.8

ALAN L. ROTMAN, Primary Examiner

U.S. Cl. X.R.

260—295 R; 424—263, 266